United States Patent [19]

Fecik et al.

[11] Patent Number: 4,564,380
[45] Date of Patent: Jan. 14, 1986

[54] ANTIBACKLASH CONVEYOR DRIVE MECHANISM

[75] Inventors: Michael T. Fecik; Gary V. Cannon, both of Pittsburgh; Gayland S. Beresik, Natrona Heights, all of Pa.

[73] Assignee: PPG Industries, Inc., Pittsburgh, Pa.

[21] Appl. No.: 685,019

[22] Filed: Dec. 21, 1984

[51] Int. Cl.[4] ............................................. C03B 35/18
[52] U.S. Cl. ...................................... 65/163; 65/348; 65/349; 198/790; 198/813; 198/832; 271/198; 271/275
[58] Field of Search ................. 65/163, 348, 349, 350; 271/198, 275; 198/789, 790, 832, 813

[56] References Cited

U.S. PATENT DOCUMENTS

| | | |
|---|---|---|
| 4,117,699 | 10/1978 | Renault ........................... 271/275 X |
| 4,133,667 | 1/1979 | Nitschke . |
| 4,233,053 | 11/1980 | Nitschke . |
| 4,332,608 | 6/1982 | Rhonehouse ...................... 65/349 X |
| 4,356,912 | 11/1982 | Nitschke ............................. 198/790 |
| 4,372,172 | 2/1983 | Gombócz et al. ............... 198/813 X |

Primary Examiner—Arthur Kellogg
Attorney, Agent, or Firm—Robert A. Westerlund, Jr.

[57] ABSTRACT

A conveyor drive mechanism has a continuous drive loop trained over first, second, and third pulleys, with the first and second pulleys disposed in driving relationship to a support bed or conveyor, and a driving facility which supplies drive torque in either direction to the third pulley, to move the drive loop and conveyor in the selected direction. Counterpoised anti-backlash motors impart equal, opposed counter-torques to the first and second pulleys to impose a predetermined level of continuous tension in the active area of the drive loop, even during reversal of the direction of the torque transmitted by the driving facility.

20 Claims, 2 Drawing Figures

ANTIBACKLASH CONVEYOR DRIVE MECHANISM

FIELD OF THE INVENTION

The present invention relates to a conveyor drive mechanism, especially suited for use in a glass manufacturing facility.

BACKGROUND OF THE INVENTION

The glass manufacturing process generally includes a series of successive, interrelated steps each of which takes place at a respective station within the glass manufacturing facility. More particularly, the usual glass manufacturing process includes the steps of drawing a sheet of glass from a bath of molten glass, conveying the molten glass sheet through an annealing furnace with a decreasing temperature gradient over its length that allows the sheet to cool slowly to prevent the buildup of compressive forces within the glass; cutting the annealed glass sheet to the shape and size desired, and tempering the cut sheet by a heating and sudden cooling process to give the glass sheet high compressive forces at its surfaces to minimize susceptibility to breakage and shattering.

The glass material must be conveyed through each of the successive stations at a controlled rate to optimize the quality of the resultant glass product. One known means for conveying the glass sheets between stations and within each station is taught in U.S. Pat. No. 4,133,667 issued to Nitschke. Nitschke '667 discloses a conveyor drive mechanism which includes first and second conveyor drives disposed on opposite lateral sides of a conveyor which includes a plurality of elongate rollers that extend between the conveyor drives and have their opposed ends supported on and in frictional engagement with the conveyor drives. Each of the conveyor drives includes first and second pulleys or sprockets, and a continuous drive loop trained thereover. The glass sheets are supported by the conveyor rollers. A first torque source applies drive torque to the first pulleys, and a second counter-torque source applies a counter-torque to the second pulleys. The cooperative effect of the first and second sources purportedly provides at least a minimum, predetermined level of tension in the active area of the continuous drive loops at all times, to minimize slack and vibration in the drive chain, to thereby minimize slip-stick friction between the glass sheets and the conveyor rollers. Motion is imparted to the conveyor rollers in either a forward or reverse direction by applying a net torque to the rollers by applying a greater drive torque with either the first or second torque sources to the first or second pulleys, respectively, whereby the glass sheets are thusly moved by the conveyor rollers in the selected direction. Nitschke '667 employs a complex control circuit for controlling the energization of the first torque source and the second counter-torque source through a range of net torques.

Nitschke teaches an improvement over his above-discussed conveyor drive mechanism in his U.S. Pat. No. 4,233,053. Nitschke '503 eliminates the control circuit and counterpoised torque sources of Nitschke '667. Nitschke '053 teaches a continuous drive loop trained over the pair of pulleys, so that the rotational motion of the pulleys is imparted to the conveyor rollers, just as in Nitschke '667, except that in Nitschke '053 one pulley is driven by a motor to transport the glass sheets over the conveyor rollers, and the other pulley drives an electrical generator connected to a dissipative load. The generator and load provide an adaptive counter-torque to the other pulley in direct relation to its rotational speed. However, the Nitschke '053 conveyor drive system only provides tension in the active area of the drive loop in a single direction. This is necessarily so, because when the direction of the motor is reversed from that shown in the Nitschke '053 patent, the active area of the drive loop is put into compression, rather than tension, which increases rather than decreases the slack in the active area of the drive loop, which can cause backlash and vibration of the drive loop, which can skew or damage the moving glass sheets. Therefore, Nitschke '053 is limited in application to unidirectional as opposed to bidirectional or oscillating conveyor drives.

Therefore, it would be advantageous to have a conveyor drive mechanism which continuously maintains a predetermined level of tension in the drive loop active area during forward and reverse modes of operation, and which is simpler and more economical in design, construction, operation, and maintenance than the presently available conveyor drive mechanisms.

SUMMARY OF THE INVENTION

The present invention encompasses a conveyor drive mechanism having a continuous drive loop trained over first, second and third pulleys, wherein the first and second pulleys are disposed in driving relationship to a glass support bed or conveyor. The conveyor drive mechanism of this invention further encompasses counterpoised anti-backlash torquing facilities for transmitting continuous, equal and opposed torque to the first and second pulleys to impose a predetermined level of continuous tension in the active area of the drive loop, to prevent vibration or backlash of the drive loop. The conveyor drive mechanism of this invention also encompasses a driving facility for transmitting a drive torque of selected magnitude and direction to the third pulley to thereby move the drive loop and glass support bed in the desired direction at a desired speed. The tension in the active area of the drive loop is continuously maintained, even during reversal of the direction of the torque transmitted by the driving facility.

DESCRIPTION OF THE INVENTION

Figure 1:
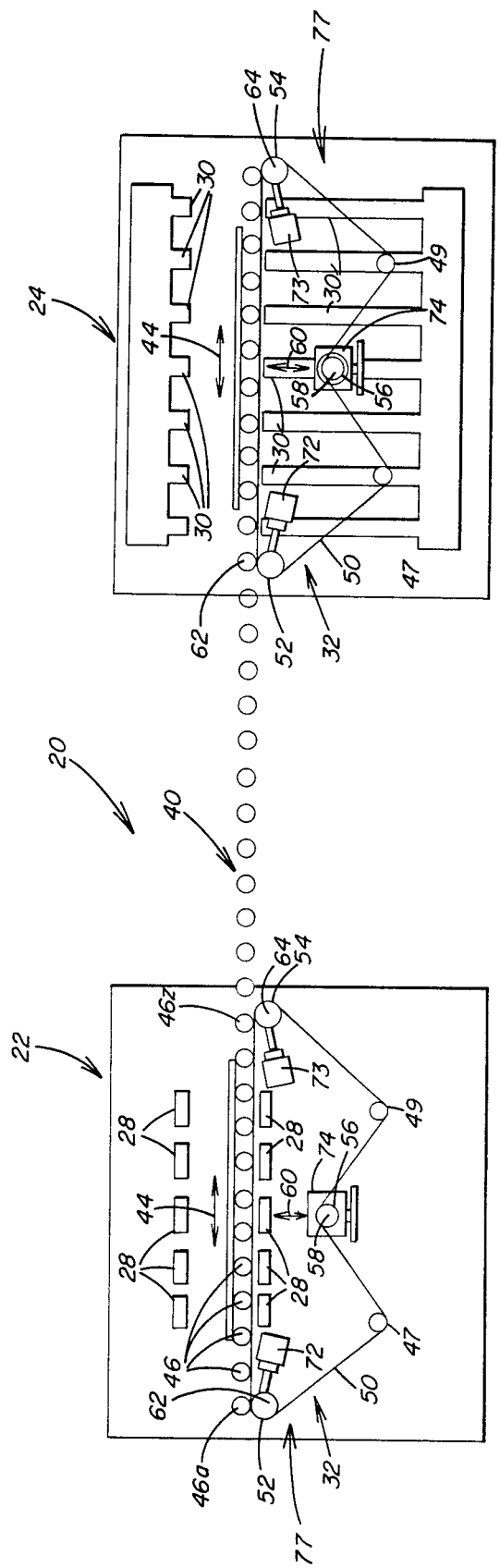
FIG. 1 is a schematic illustration of a glass tempering station having two sub-stations which have a conveyor drive mechanism incorporating features of this invention.

FIG. 1 schematically illustrates a glass tempering station 20 generally including a furnace sub-station or furnace 22 and a quench sub-station or quench 24, each of which performs cooperative functions in the overall glass tempering process.

Broadly, the tempering process can be divided into two basic steps. In the first step, a glass sheet 26 that is to undergo tempering is heated by a plurality of heating elements 28 in the furnace 22 to its softening temperature e.g. about 1200° F. (660° C.) for float glass. In the second step, both major surfaces of the heated glass sheet 26 are subjected to a flow of cooling air emanating from a plurality of air nozzles 30 in the quench 24. In general, the heating and subsequent rapid cooling of the glass sheet 26 causes high compressive forces to be set up in the outer surfaces of the sheet 26 to minimize its susceptibility to breakage and shattering. A more detailed and comprehensive understanding of the glass tempering process can be obtained from a reading of U.S. Pat. No. 4,185,986 issued to Robert Frank, whose teachings are herein incorporated by reference.

The furnace 22 of the tempering station 20 used in the actual practice of this invention is of the oscillating type. It should be understood, however, that the type of furnace used in the practice of this invention is not limiting to the invention, as will be hereinafter more fully appreciated.

The furnace 22 further includes a conveyor drive mechanism 32. The conveyor drive mechanism 32 incorporating features of this invention includes a continuous or endless drive loop 50 trained over spaced apart first, second, and third pulleys 52, 54, and 56, respectively. The first and second pulleys 52, 54 are advantageously disposed opposite to each other in a plane parallel to the glass sheet 26 movement path 44, and the third pulley 56 is preferably disposed below and between the first and second pulleys 52, 54 relative to the sheet movement path 44. The third pulley 56 preferably rotates about an axis 58 normal to the vertical centerline 60 between the rotational axes 62, 64 of the first and second pulleys 52, 54, respectively. In the practice of the invention, the continuous drive loop 50 comprises an endless steel drive chain, and the first, second, and third pulleys 52, 54, 56 have teeth (not shown) formed about their periphery to define sprockets.

In the actual practice of the invention, the endless drive chain 50 has its path under and in contact with guide sprockets or idler wheels 47, 49 advantageously disposed above or below and to the left and right, respectively, of the third pulley 56 to maximize the drive traction between the drive chain 50 and the third pulley 56. In FIG. 1, the guide sprockets 47, 49 are disposed below and to the left and right of the third pulley 56. The guide or idler sprockets are not limiting to the invention.

The conveyor drive mechanism 32 further includes first and second torquing facilities 72, 73 functionally connected to the first and second sprockets 52, 54, and a driving facility 74 functionally connected to the third sprocket 56. In the practice of the invention, the first torquing facility 72 is supported by a first mounting structure (not shown) which is conveniently attached to a superstructure (not shown) which supports a glass support bed 40, and the second torquing facility 73 is supported by a second mounting structure (not shown) which is also conveniently attached to the superstructure. The glass support bed 40 supports the glass sheet 26. The glass support bed 40, in the practice of the invention, includes a plurality of elongate, cylindrical, ceramic rollers 46 spaced apart from each other in the direction of the sheet movement path 44. The rollers 46 extend laterally with respect to the sheet movement path 44, each roller 46 having an endcap sprocket assembly (not shown) at one end thereof, the opposite end of each roller 46 being freely, rototably supported by the superstructure. The endcap sprocket assembly (not shown) of each of the rollers 46 is cooperatively, frictionally engaged with the drive chain 50 of the oscillating conveyor mechanism 32. The first and second torquing facilities 72, 73 used in the practice of the invention are DC-torquing motors. The first sprocket 52 is located below and adjacent to one endmost roller 46a of the glass support bed 40 and the second sprocket 54 is located opposite to the first sprocket 52 at a position below and adjacent to the opposite endmost roller 46z of the glass support bed 40. The driving facility 74 is supported by a third mounting structure (not shown) which is conveniently attached to the floor (not shown) or to the superstructure (not shown). The driving facility 74 used in the practice of the invention is a DC drive motor.

In operation, the first and second torquing motors 72, 73, hereinafter called anti-backlash motors 72, 73, impart controlled counter-torques $T_1$ and $T_2$, respectively, of opposite direction and equal magnitude, to the first and second sprockets 52, 54, respectively, thereby setting up equal, opposed tensional forces in the drive chain 50, especially in the critical span or active area 77 of the chain 50 which is frictionally engaged with the endcap sprocket assembly (not shown) of each of the rollers 46, thereby preventing slackening and/or vibration of the chain 50, which if not eliminated, can cause the rollers 46 to lift up and bounce, thereby causing damage to the glass sheet 26, lost tracking motion, and/or skewing of the glass sheet 26 on the glass support bed 40. It is important to understand that the torque $T_1$ is counter-clockwise and the torque $T_2$ is clockwise, when the conveyor drive mechanism 32 is disposed on the right-hand side of the glass support bed 40 of the furnace 22 of the bed 40 as viewed in the direction the sheet 26 travels between the furnace 22 and the quench 24.

Simultaneously with or subsequent to the activation of the anti-backlash motors 72, 73, the drive motor 74 is actuated, thereby transmitting a drive torque $T_3$ of any selected magnitude and direction to the third sprocket 56, thereby imparting commensurate rotational motion to the drive chain 50 which delivers the drive torque $T_3$ to the rollers 46 to thereby convey the glass sheet 26 at the desired speed in the desired direction. The glass sheet 26 is oscillated or moved back and forth from one end to the other end of the furnace 22, at varying speeds, in order to most effectively temper the glass sheet 26. Therefore, the conveyor drive mechanism 32 is of the oscillating variety in the practice of this invention. As the glass sheet 26 approaches an end portion of the furnace 22, the drive motor 74 is shifted to the reverse mode (i.e. the drive torque $T_3$ is oppositely directed), to impart an oppositely directed torque $T_3$ of any desired magnitude to the drive sprocket 56 and through the drive chain 50 to the sprocket assembly (not shown) of each of the rollers 46, thereby moving the glass sheet 26 toward the opposite end portion of the furnace 22. The direction of the drive torque $T_3$ is periodically reversed in the above-described manner until the glass sheet 26 has been sufficiently heated.

Referring also to FIG. 1, the quench 24 also includes a glass support bed 40 oscillated by an oscillating conveyor drive mechanism 32 to cyclically move the glass sheet 26 back and forth from one end to the other end of the quench 24 until the glass sheet 26 is sufficiently cooled, thus completing the tempering process. The operation of the conveyor drive 32 is the same as was described above with respect to the conveyor drive 32 of the furnace 22.

During the above-described operation of the conveyor drive 32 of either the furnace 22 or the quench 24, the following occurs. The two counterpoised anti-backlash motors 72, 73 continuously supply equal, opposed counter-torques $T_1$ and $T_2$ (i.e. $|T_1|=|T_2|$ and $T_2=(-T_1)$), to the first and second sprockets 52, 54, respectively, thereby continuously maintaining the active area 77 of the drive chain 50 in a state of imposed tension during each oscillation cycle. The magnitude of the tension varies with the magnitude of the equal, opposed counter-torques $T_1$, $T_2$ applied by the motors 72, 73. During operation of the oscillating conveyor drive 32, when the drive motor 74 reverses direction, it decelerates, momentarily stops, and then accelerates in the reverse direction, during which time period the continuous, opposing, equal tensional forces supplied by the counterpoised anti-backlash motors 72, 73 prevents any slack or backlash from occurring in the drive chain 50, thereby preventing lost tracking motion of the rollers 46 and/or the moving glass sheet 26, thereby preventing marring of the glass sheet surface in contact with the rollers 46 and/or skewing of the glass sheet 26 on the rollers 46. Therefore, a smooth transition of the direction of glass sheet 26 movement is achieved.

Figure 2:
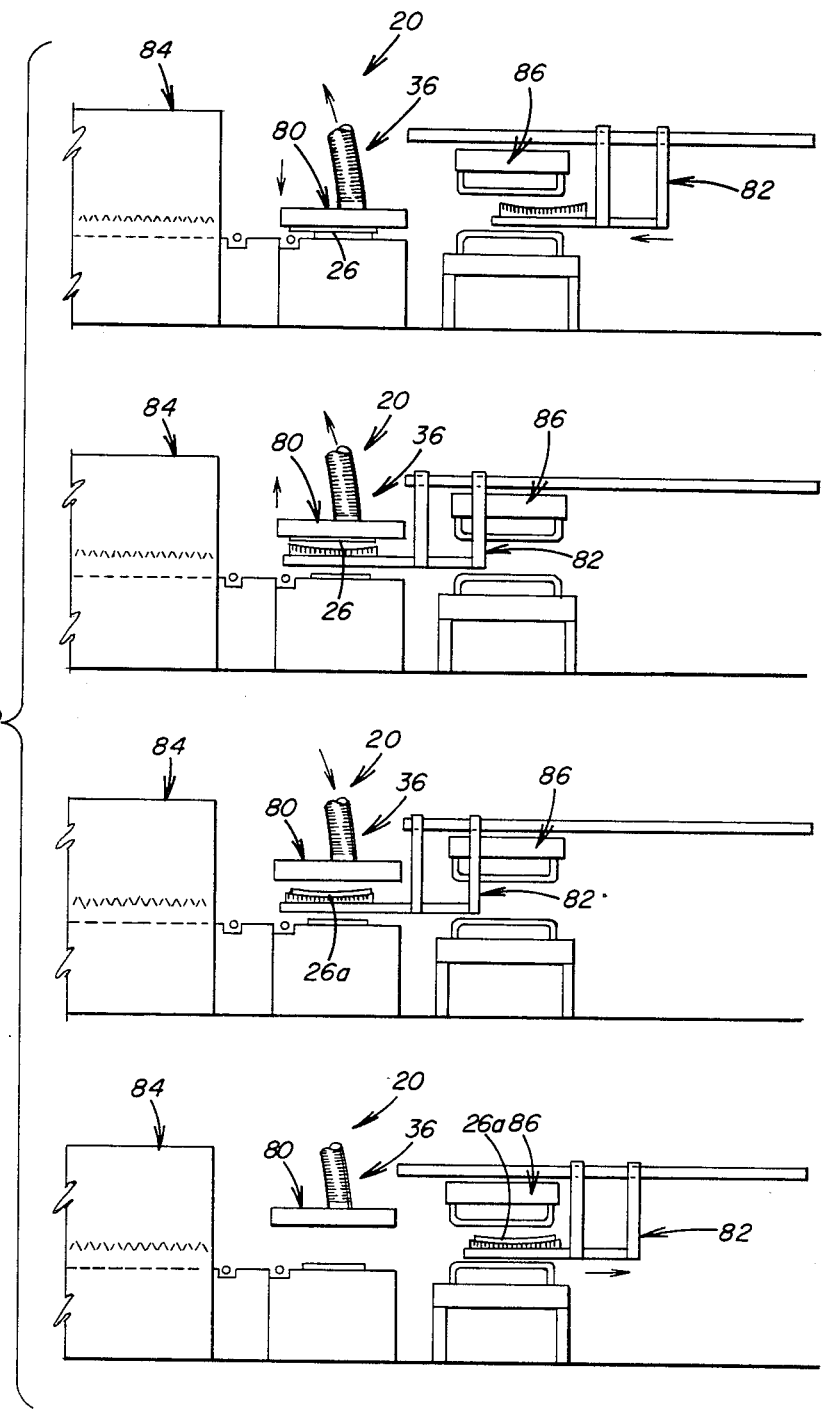
FIG. 2 is a schematic illustration of an operational sequence of a glass bending and tempering station.

With additional reference to FIG. 2, the glass tempering station 20 used in the actual practice of this invention includes a horizontal press-bending sub-station 36 interposed between a furnace 84 and a quench 86. The press-bending sub-station 36 includes means 82 for transporting or shuttling the glass sheet 26, after it has been raised to the desired temperature within the furnace 84 (e.g. a temperature such as 1220° F. (660° C.) at which the glass sheet 26 is deformable), from the furnace 84 to a position within the press-bending sub-station 36 whereat it is subjected to bending by bending facilities 80. The shuttling means 82 further functions to transport or shuttle the bent glass sheet 26a from the bending sub-station 36 to the quench 86, wherein it is subjected to rapid cooling as hereinbefore described. Skewing of the glass sheet 26 can cause it to be mislocated in the bending sub-station 36, which can result in the glass sheet 26 being bent improperly or into a shape different than the desired shape. However, by employing a conveyor drive mechanism incorporating features of this invention, such as described hereinabove, to move the sheet 26 within the furnace 84, this skewing problem has been eliminated, thereby resulting in accurate bending of the sheets 26 by the bending facilities 80.

It should be understood that neither the type of torquing facilities 72, 73 nor the type of driving facility 74 used in the practice of this invention, nor the configuration in which they are employed is limiting to the invention. Further, neither the type of glass support bed 40 nor the type of endless drive loop 50 is limiting to the invention. Yet further, although the present invention has been described in the context of a glass tempering station 20 it should be understood that the invention is not limited to practice within this environment, but rather can be practiced in any environment wherein a conveyor means is employed to transport any type of article in either an oscillating or continuous fashion, or a combination thereof.

Many modifications and/or alternative embodiments of the present invention are possible in view of the foregoing teachings. It is, therefore, to be understood that these alternative embodiments are encompassed within the spirit and scope of this invention, and that further, the invention may be practiced otherwise than as specifically described, within the scope of the appended claims.

What is claimed is:

1. A conveyor drive mechanism for driving an article conveyor, comprising:
    first, second, and third pulleys spaced apart from each other;
    an endless drive loop trained over said first, second, and third pulleys, wherein said drive loop has an active area disposed in driving relationship to said article conveyor;
    a means for imparting a first torque of a predetermined magnitude and direction to said first pulley;
    a means for imparting a second torque of a predetermined magnitude and a direction opposite to the direction of said first torque, to said second pulley, to impose opposed tensional forces in said active area of said drive loop; and
    a means for imparting a drive torque of selected magnitude and direction to said third pulley to thereby impart commensurate rotational motion to said drive loop to drive said article conveyor.

2. The conveyor drive mechanism as set forth in claim 1, wherein said first torque and said second torque are of equal magnitudes and opposite direction, to thereby impose equal, opposed tensional forces in said active area of said drive loop, to prevent backlash, slack, or vibration of said drive loop.

3. The conveyor drive mechanism as set forth in claim 2, wherein said first pulley and said second pulley are disposed opposite to each other at opposite ends of the article conveyor.

4. The conveyor drive mechanism as set forth in claim 3, wherein said third pulley is disposed below said first and said second pulleys, relative to the article movement path.

5. The conveyor drive mechanism as set forth in claim 4, wherein said first, second, and third pulleys have first, second, and third rotational axes, respectively, and wherein further, said third rotational axis is normal to vertical centerline between said first and second rotational axes.

6. The conveyor drive mechanism as set forth in claim 5, wherein said endless drive loop comprises an endless drive chain.

7. The conveyor drive mechanism as set forth in claim 6, wherein said first, second, and third pulleys each comprise a sprocket.

8. The conveyor drive mechanism as set forth in claim 7, wherein said first torque imparting means, said second torque imparting means, and said drive torque imparting means each comprise a drive motor.

9. The conveyor drive mechanism as set forth in claim 8, wherein each said motor is a DC-motor.

10. The conveyor drive mechanism as set forth in claim 8, wherein each said motor is an AC-motor.

11. The conveyor drive mechanism as set forth in claim 7, wherein said first torque imparting means is a drive motor and said second torque imparting means is a passive retarder means.

12. The conveyor drive mechanism as set forth in claim 7, wherein article to be conveyed by the article conveyor is a glass article.

13. The conveyor drive mechanism as set forth in claim 12, wherein the article conveyor is a glass processing station article conveyor.

14. The conveyor drive mechanism as set forth in claim 13, wherein the glass processing station is a glass tempering furnace.

15. The conveyor drive mechanism as set forth in claim 14, wherein the glass tempering furnace is of the oscillating type.

16. The conveyor drive mechanism as set forth in claim 13, wherein the glass processing station is a glass tempering station including a furnace sub-station and a quench sub-station, and wherein the article conveyor includes a furnace sub-station article conveyor and a quench sub-station article conveyor.

17. The conveyor drive mechanism as set forth in claim 16, wherein the glass tempering station further includes a glass bending sub-station interposed between the furnace sub-station and the quench sub-station.

18. The conveyor drive mechanism as set forth in claim 7, wherein it further includes means to maximize drive traction between said drive chain and said third sprocket.

19. The conveyor drive mechanism as set forth in claim 18, wherein said drive traction maximizing means includes idler wheels.

20. The conveyor drive mechanism as set forth in claim 19, wherein said idler wheels include a first idler wheel spaced from said third sprocket and a second idler wheel spaced from said third sprocket and said first idler wheel, wherein said drive chain is further trained over said first and second idler wheels.

* * * * *